United States Patent [19]

Blaszak et al.

[11] Patent Number: 5,120,609
[45] Date of Patent: Jun. 9, 1992

[54] THERMOPLASTIC ELASTOMERIC SHEET TRANSPORT MEMBER

[75] Inventors: J. Robert Blaszak, Penfield; Csaba Z. Konya, Pittsford; Margaret C. Plain, Rochester, all of N.Y.

[73] Assignee: Xerox Corporation, Stamford, Conn.

[21] Appl. No.: 527,401

[22] Filed: May 23, 1990

[51] Int. Cl.⁵ .................... B32B 9/04; B32B 13/04
[52] U.S. Cl. .................................. 428/446; 29/132; 355/284; 355/313; 355/319; 355/321; 428/447; 428/451; 428/913; 428/914
[58] Field of Search ............... 428/447, 451, 913, 914, 428/446; 355/284, 321, 313, 319; 29/132

[56] References Cited

U.S. PATENT DOCUMENTS

| | | | |
|---|---|---|---|
| 4,017,172 | 4/1977 | Lynch | 355/8 |
| 4,192,497 | 11/1979 | Perun et al. | 271/124 |
| 4,386,179 | 5/1983 | Sterling | |
| 4,481,323 | 11/1984 | Sterling | 524/269 |
| 4,511,354 | 4/1985 | Sterling | 604/98 |
| 4,613,640 | 9/1986 | Deisler et al. | 524/264 |
| 4,660,963 | 4/1987 | Stemmle | 355/24 |
| 4,686,549 | 8/1987 | Williams et al. | 503/227 |
| 4,901,117 | 2/1990 | Derrick | 355/309 |

Primary Examiner—Merrell C. Cashion, Jr.
Assistant Examiner—D. S. Nakarani

[57] ABSTRACT

A sheet transport member has at least one surface for movable engagement with a sheet to be transported made from an elastomeric thermoplastic styrene-ethylene-butylene-styrene block copolymer and a polysiloxane substantially uniformly dispersed throughout the copolymer, the polysiloxane being present in an amount of from about 0.5% to 8% by weight of the total weight of the composition and having a viscosity of from about 20 to 1,000,000 centistokes.

14 Claims, 3 Drawing Sheets

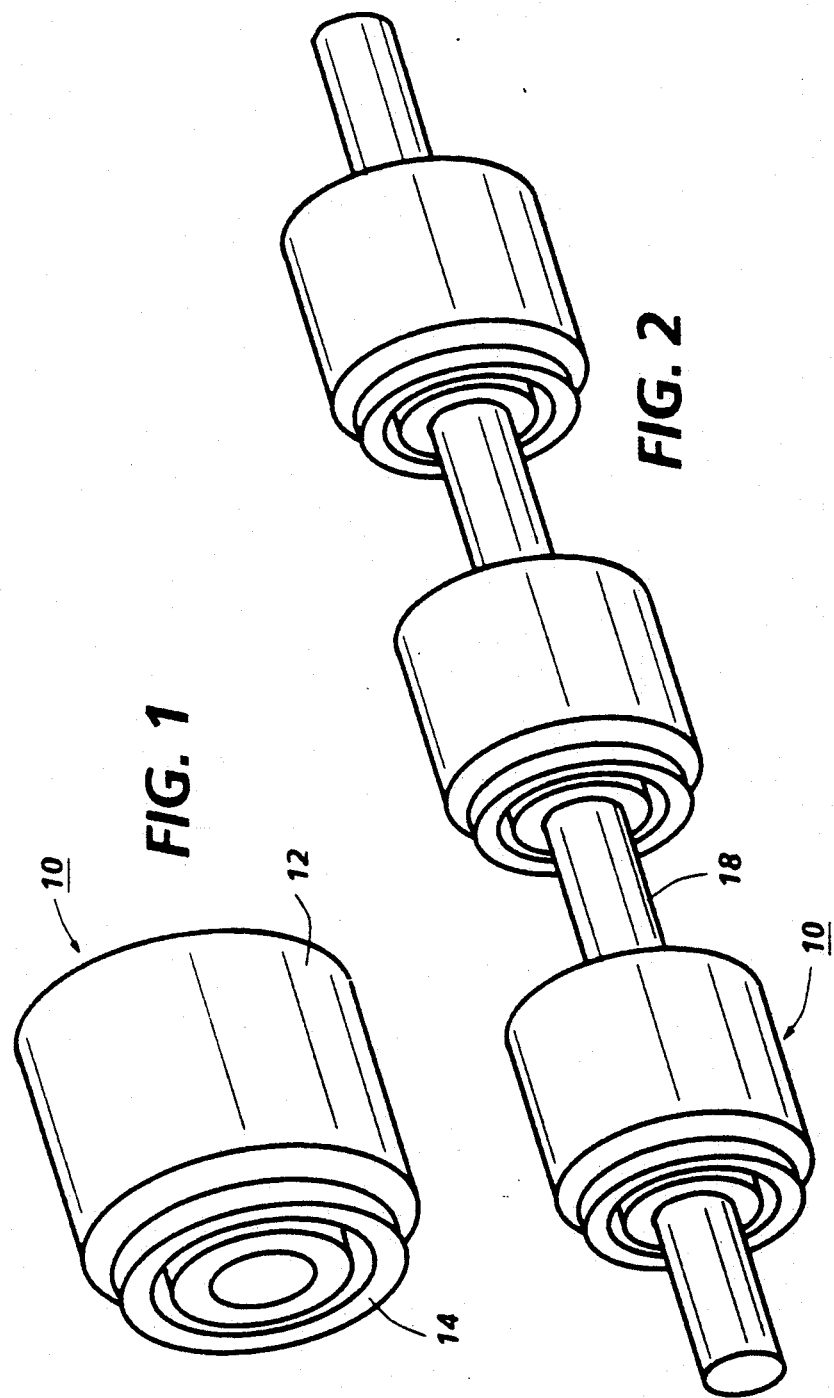

THERMOPLASTIC ELASTOMERIC SHEET TRANSPORT MEMBER

BACKGROUND OF THE INVENTION

The present invention relates to a sheet transport member and in particular to a thermoplastic elastomeric sheet transport member useful in automatic printing machines.

In an electrostaticgraphic reproducing apparatus commonly in use today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image areas contained within the usual document. Subsequently, the electrostatic latent image on the photoconductive insulating surface is made visible by developing the image with developing powder referred to in the art as toner. Most development systems employ a developer material which comprises both charged carrier particles and charged toner particles which triboelectrically adhere to the carrier particles. During development the toner particles are attracted from the carrier particles. During development the toner particles are attracted from the carrier particles by the charge pattern of the image areas on the photoconductive insulating area to form a powder image on the photoconductive areas. This image may subsequently be transferred to a support surface such as copy paper to which it may be permanently affixed by heating or by the application of pressure. Following transfer of the toner image to a support surface, the photoconductive insulating member is cleaned of any residual toner that may remain thereon in preparation for the next imaging cycle. Alternatively, the electrostatic latent image may be generated from information electronically stored or generated in digital form which afterwards may be converted to alphanumeric images by image generation, electronics and optics. In such a printer application a beam of light such as a laser beam may be used to selectively discharge the photoconductor. For further details of such apparatus, attention is directed to, for example, U.S. Pat. No. 4,660,963 to Stemmle and U.S. Pat. No. 4,901,117 to Derrick.

Commercial applications of this apparatus have become increasingly complex offering the users a variety of printing and copying options. In addition to being capable of providing printing on one side of a sheet of paper, one of the options of particular interest is the capability of such machines to produce printing on both sides of a sheet of paper, which is referred to as duplex copying or printing. In addition, another capability being provided is that of being capable of providing two-color or highlight color simplex toner images on one side only of the copy or print. In both of these operations, the copy sheet or print sheet passes through the processor more than once. It is conventional in many processors to employ a fusing system wherein the toner image is heated to a temperature of the order of about 400° F. to raise the temperature of the thermoplastic toner material to a level at which it will coalesce and penetrate into the sheet substrate, typically paper fibers. This action is typically performed by a fuser roll which typically has applied to its surface a release agent such as a silicone oil to form an interfacial layer between the surface of the fuser roll and the toner image on the copy or print sheet which splits when the copy or print sheet passes through the fusing nip providing release of the toner from the fuser roll surface. As a result, the copy or print sheet has a small amount of silicone release agent on its surface. This silicone release agent has been found to have an adverse effect on the reliability of transport members such as duplex feed rolls which may subsequently come into contact with the sheet having once passed through the fuser. Typical transport members that experience a difficulty include feed rolls and transport rolls made from isoprene or EPDM, (terpolymer elastomer made from ethylene-propylene diene monomer) for example, wherein after a relatively short period of time of feeding or transporting once fused sheets a layer of silicone oil forms on the surface of the transport or feed roll forming an oil slick making the surface slippery and dramatically reducing the reliability of the feeding or transport mechanism. This is particularly prevalent in friction retard feeders which use a high friction driver material for feeding sheets of paper and a somewhat lower friction retarding material whose function it is to ensure that only a single sheet is fed at a time. This difficulty is minimized by the selection of several silicone elastomeric materials to be used in a friction retard feeder device because the silicone rubber surface absorbs the silicone oil with a very slight swelling at the surface and thereby a softening of the silicone rubber which maintains a higher coefficient of friction altogether in the presence of the silicone oil.

Certain machine geometries or designs may require a feeder to perform both the feeding of fresh paper for simplex reproduction and the feeding of once fused oil contaminated paper for duplex reproduction. We have now found that typical silicone rubbers employed in such an environment become unreliable sheet feeders due to the surface of the feed members becoming contaminated with paper fibers and fillers from the virgin paper. Contaminates such as clay, talc, and starches adhere to the surface of the feeder transport rolls thereby decreasing the reliability of the feeder transporting member. In addition, small paper fibers which have been transferred to the roll of the feeder transport member may act like little roller bearings on the surface of feeder transport member further contributing to the feeding and transporting unreliability. Accordingly there is a need for a feeding and transporting member which is capable of performing both the feeding of fresh paper in a simplex mode of printing and feeding of once fused and oil contaminated paper in a duplex printing operation.

SUMMARY OF THE INVENTION

We have found a thermoplastic elastomeric material with properties uniquely suited to sheet feeding and transporting applications which have the advantage of minimizing the above problem.

In accordance with a principle aspect of the present invention a sheet transport member having at least one surface for engagement with the sheet to be transported comprises an elastomeric thermoplastic styrene- ethylene-butylene-styrene block copolymer and a polysiloxane substantially uniformly by dispersed throughout the copolymer, the polysiloxane being present in an amount from about 0.5% to 8% by weight of the total weight of the composition and having a viscosity of from about 20 to 1,000,000 centistokes.

In accordance with a further aspect of the present invention the surface of the transport member is the exterior surface of a cylindrical sheet transport roll.

In accordance with a further aspect of the present invention mineral oil is dispersed substantially uniformly throughout the block copolymer and is present in an amount of from about 30% to 50% by weight of the total weight of the composition.

In accordance with a further aspect of the present invention the mineral oil is present in an amount of about 40% by weight of the total weight of the composition.

In accordance with a further aspect of the present invention the polysiloxane is present in an amount from about 4% to about 6% by weight of the total weight of the composition.

In accordance with a further aspect of the present invention, the polysiloxane has the formula

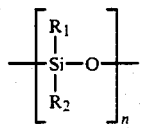

where $R_1$ and $R_2$ may be hydrogen, methyl or phenyl and $10 < n < 20,000$.

In accordance with a further aspect of the present invention the surface comprises the exterior surface of an endless sheet transport belt.

For a better understanding as well as other objects and further features thereof reference is had to the following drawings and descriptions.

BRIEF DESCRIPTION OF THE DRAWINGS

FIG. 1 is an isometric representation of a sheet transport member in the configuration of a cylindrical sheet transport roll.

FIG. 2 is an isometric representation of a transport assembly including a plurality of rolls on a driven shaft.

DESCRIPTION OF PREFERRED EMBODIMENT

Figure 3:
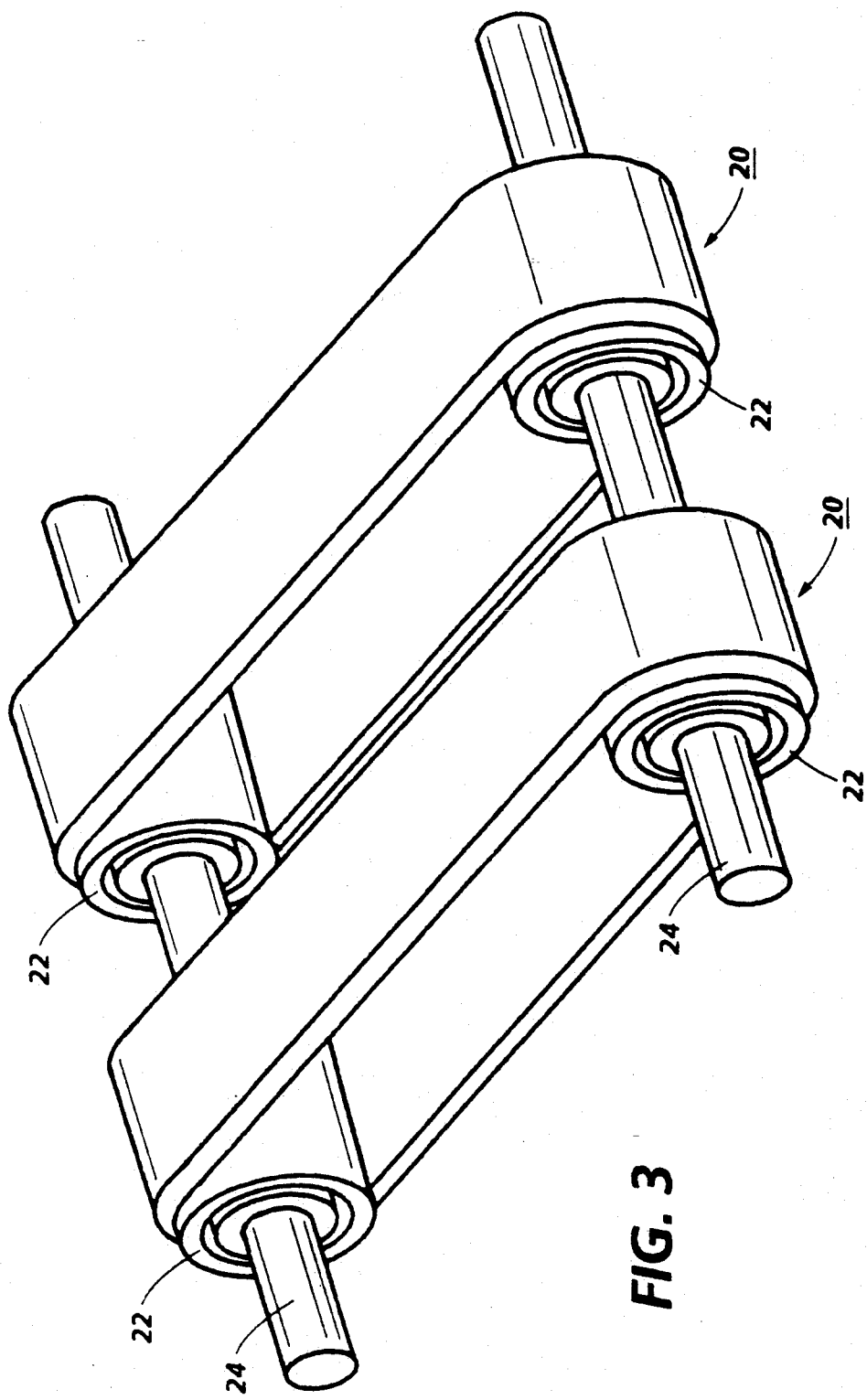
FIG. 3 is an isometric representation of an alternative embodiment wherein the transport member according to the present invention is in the form of a transport belt.

We have found a thermoplastic elastomeric sheet transport member which has a long life with a stable coefficient of friction even when operating in an environment contaminated by silicone oil, paper debris and toner. The sheet transport member according to the present invention is made from an elastomeric thermoplastic styrene-ethylene-butylene-styrene block copolymer and a polysiloxane substantially uniformly disbursed throughout the copolymer as described in greater detail, for example in U.S. Pat. No. 4,386,179 and U.S. Pat. No. 4,481,323 to Sterling, both of which are hereby incorporated herein in their entirety.

In the styrene-ethylene-butylene-styrene macromolecule the styrene blocks typically constitute about 20 to 50 percent of the copolymer's weight while the ethylene-butylene block provides the remaining 50 to 80 percent. The styrene blocks themselves normally have a molecular weight in the range of 5,000 to 40,000. The ethylene-butylene block has a molecular weight greatly exceeding that of the styrene blocks and falling within the approximate range of 20,000 to 500,000. The total molecular weight of the copolymer typically ranges from 50,000 to 600,000. In a specific embodiment the styrene blocks of the copolymer have a molecular weight of about 8,000 to 20,000 and the ethylene-butylene blocks of the copolymer have a molecular weight of about 20,000 to 200,000.

The polysiloxane, which is an essentially linear polysiloxane, has a kinematic viscosity within the range of about 20 to about $10^6$, preferably about 200 to 13,000 centistokes at room temperature (20° to 25° C.).

A typical example of the polysiloxane has the repeating structure:

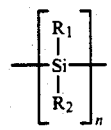

wherein $R_1$, $R_2$ are hydrogen methyl or phenyl with $CH_3$ being preferred, and n is a positive integer having a value ranging from 10 to 20,000.

Preparing the elastomeric composition involves first forming a mixture of the elastomeric thermoplastic hydrocarbon block copolymer with the polysiloxane. This mixture then receives sufficient heat to melt the copolymer. The application of pressure to the melted mixture intimately combines the components to produce the elastomer composition. The steps of heating the mixture and the application of the shearing pressure usually take place in an extruder. Increasing the pressure applied to the melted mixture appears to improve the properties of the final product. The extruder may even have a large portion, for example 40 percent, of the flights on its screw in its metering section and a compression ratio of 4 to 1 or even greater. The pressure thus applied to the melted mixture may well approach 1,500 p.s.i., 3,500 p.s.i., or even much higher.

The polysiloxane is essentially linear as shown in the above formula. A preferred example of the polysiloxane is a silicone oil where both of the radicals $R_1$ and $R_2$ are methyl groups.

The viscosity of the polysiloxane should permit its facile coating of and mixing with the crumbs or pellets of the elastomer. This results in a general requirement that the kinematic viscosity be within the range of about 20 to 1,000,000 centistokes. At the lower end of the above range, the polysiloxane encounters some difficulty in coating the polymer pellets. In a preferred embodiment, silicone oil having a kinematic viscosity of 200 to 13,000 centistokes works well.

The polysiloxane generally constitutes about 0.5 to 8 percent of the total weight of the elastomeric composition, preferably from 4 to 6 percent. The ability of the hydrocarbon to take up this amount of the polysiloxane is surprising; the hydrocarbon backbone of the polymer has a drastically disparate nature as compared to the silicone structure of the polysiloxane.

The surprise becomes even greater for polymeric compositions that already include substantial amounts of mineral oil as a lubricant. Mineral oil, if present may account for up to 50 percent of the total weight of the composition. Typically the mineral oil constitutes from 30 to 50 percent, preferably 40 percent, of the composition's total weight.

Furthermore, the mineral oil and the polysiloxane also have distinctly different chemical properties. The former has a hydrocarbon composition as compared to the silicone of the polysiloxane. Moreover, the mineral oil fills the spaces that would presumably accommodate the polysiloxane. Yet, a composition having 50 percent of mineral oil can still assimilate several percent of the polysiloxane to produce a drastically different elastomer.

Other adjuvants may be incorporated in the polymer for their conventional function. For example, processing aids, coloring agents, and fillers, etc. may be used. Adding a foaming agent to the polymer during its formulation will provide a substantially different type of product. Rather than a substantially solid material, a cellular product filled with air and a substantially reduced density will result. This cellular thermoplastic elastomer will have the general feel of a sponge. One such foaming agent is azobisformamide. Added in the amount of about two percent, it creates $CO_2$ gas. The bubbles of gas, covered by the molten elastomer, produce, after solidification, the sponge-like material.

Preparing the elastomeric composition with the dispersed polysiloxane begins with the hydrocarbon block copolymer. Mixing the crumbs or pellets of the elastomeric resin, which may be one or more block copolymers having different amounts of the constituent blocks, with the polysiloxane should result in a coating of the former with the latter. To do so, the pellets or crumbs and the polysiloxane may be mixed in a tumbler. Any additional ingredients may also be added to the mixture at this point.

The coated elastomer pellets or crumbs next receive sufficient heat to induce their melting. Applying a shearing pressure to the melted coated crumbs or pellets appears to induce a substantially uniform dispersement of the polysiloxane in the mixture. The heat required to effectuate the melting, of course, depends upon the individual elastomer. Typically, it ranges from 160° C. to 225° C.

After melting the block copolymer by heating, the mixture comprising the block copolymer, the polysiloxane and other suitable ingredients described above may be optionally fed through a plurality of calender rolls to form sheets of the mixture. Thereafter, the sheets are subjected to shearing pressure by feeding the cut strips of sheets to an extruder or a compression molding machine for better dispersion of the polysiloxane.

To ensure adequate stability and dispersion of the polysiloxane, the composition is subjected to an appropriate amount of pressure, usually about 1,500 p.s.i. By increasing the pressure, further improved properties of the product may be obtained. Thus, the molten mixture may be subjected to pressures of 2,500 p.s.i., or higher.

An extruder provides the most convenient means of achieving the temperature and pressures required to disperse the polysiloxane within the composition. An extruder typically has several temperature zones and thus can pass the crumbs or pellets of the polymer through the temperature stages required for melting.

The figures are merely illustrative of the types of feed members which may be used in the practice of the present invention. In FIG. 1, a transport roll, such as a feed roll 10, which may be used for the feeding of both fresh paper and once fused duplex paper is illustrated as a rotatable cylindrical roll having a surface 12 from the thermoplastic elastomer according to the practice of the invention on a mounting hub 14. FIG. 2, on the other hand, illustrates a plurality of transport rolls 10 which could be mounted along a transport path wherein the rolls are mounted to a shaft 18 which may be driven about one end. FIG. 3 illustrates the alternative embodiment wherein the transport surface is the surface of a belt 20, typically an endless belt, made from the thermoplastic elastomer according to the practice of the present invention which may be supported by a substrate. The belts 20 are supported about rolls 22 mounted on shafts 24.

The transport members can be fabricated with conventional techniques used in the thermoplastic industry including extrusion wherein the thermoplastic elastomer pellets are heated to a temperature at which the material flows, typically the glass transition temperature of styrene before or concurrently with molding or extrusion. While not wishing to be bound to any theory it is believed that a gelated pseudo interpenetrating network is formed by processing the block copolymer, silicone oil and mineral oil at temperatures in the range of 300° to 400° F. which tends to gel, the mineral oil providing an intertwining molecular structure between the polysiloxane and mineral oil within the block copolymer. It is believed that this gel or stable structure is not completely uniform but rather has some random concentration and is therefore referred to as a pseudo interpenetrating network rather than a complete interpenetrating network.

The surface effects produced by the polysiloxane appear to derive from a slightly increased concentration of silicone molecules at the composition's surface. The processing techniques described should typically result in a uniform dispersion of the polysiloxane throughout the composition. However, a slight migration of the silicone molecules to the material's surface, to a depth of about 5.0 to 20.0 nm., appears to have a concentration of silicone molecules approximately twice that of the bulk of the material. The thinness of this layer, of course, prevents the greater concentration there from effecting the bulk concentration of the polysiloxane throughout the material. Consequently, on a macroscopic scale, the material has a substantially uniform distribution of the polysiloxane. This gives the surface substantially different properties than the hycrocarbon block copolymer without the polysiloxane.

While the theory of how the present sheet transport member operates in the feeding of sheets which have passed through the fuser once and have a surface film of silicone oil as well as virgin or new sheets is not fully understood, it is believed that the coefficient of friction is maintained because the feed roll acts in part as an elastomer absorbing the silicone oil release agent, swelling slightly, softening at the surface and thereby slightly increasing what otherwise would have been a decreasing coefficient of friction. Further, in feeding virgin or new sheets it is believed that the coefficient of friction remains substantially constant because the polysiloxane is present at a somewhat elevated concentration at the roll surface enabling an increased softening and thereby deformation by a sheet being fed only at the roll surface. In addition, because of this softening the sheet may act as an abrading agent, wearing away a very thin layer of material, exposing a fresh surface for the next sheet being fed.

As used herein, the term sheet is intended to define conventional sheets such as ordinary paper upon which copies and prints may be made in automatic printing machines. It is also intended to include specialty papers and other types of sheets which may be fed through automatic sheet transport devices.

EXAMPLES

Figure 4:
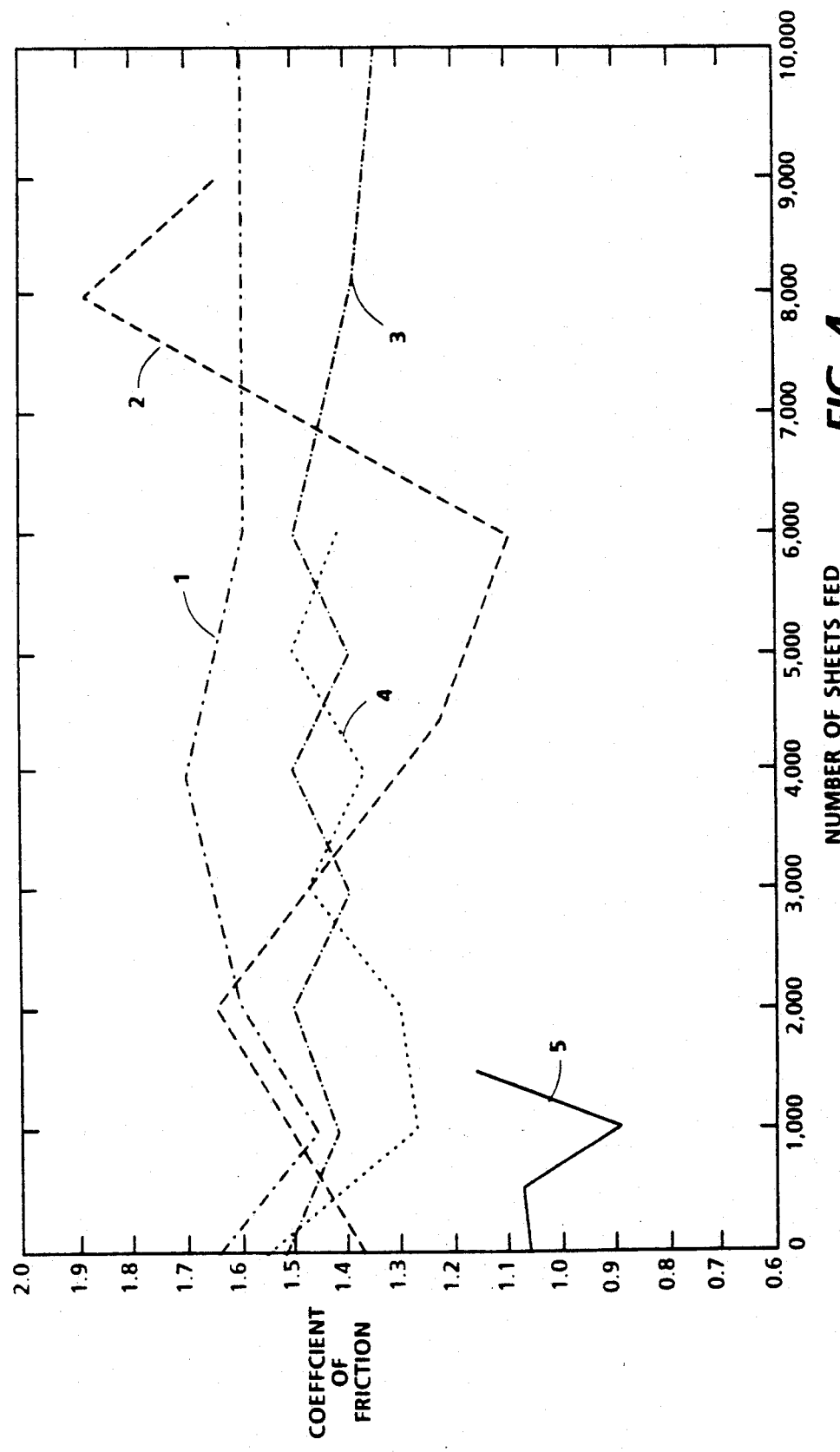
FIG. 4 is a graphical representation of some test result for coefficient of friction.

Feed rolls of various materials were tested in a test fixture for feeding up to 10,000 sheets of both fresh and once fused sheets. Starting initially with fresh sheets the fresh and once fused sheets were alternately fed by the feed rolls usually, but not always, in sets of 1,000 sheets. The coefficient of friction was periodically measured prior to switching from fresh paper sheets to once fused paper sheets and vice versa. Tabulated below and graphically illustrated in FIG. 4 are the results of these tests. Feed rolls No. 1 were made from a thermoplastic elastomer styrene-ethylene-butylene-styrene block copolymer and a polysiloxane substantially uniformly dispersed through the copolymer according to the present invention. The thermoplastic elastomer was LSHR 45A available from Concept Polymer Technologies, Inc. of Clearwater, Florida. As observed this roll exhibited the best stability for maintaining the coefficient of friction at an acceptably high level when feeding fresh sheets and once fused sheets. An acceptable level of coefficient of friction in feeding both kinds of sheets is one which is generally above 1.50 and never below 1.4 since below these values the net drive force on a sheet being feed is reduced to such a level that feeding reliability decreases to a point where on occassion it becomes impossible to drive or feed a sheet. The net drive force is equal to the difference between the products of the normal force times the coefficient of friction on the feed roll and the normal force times the coefficient of friction on the retard surface and as this difference is reduced or approaches zero the magnitude of the net drive force on a sheet is reduced to a level where the reliability in feeding a sheet is unacceptable.

The data on rolls 2–5 is presented for comparative purposes only. Roll No. 2 was fabricated from an isoprene, Endur polypisoprene compound A-731 available from Rogers Corporation, Rogers, Conn. Roll No. 3 was an EPDM (terpolymer elastomer made from ethylene-propylene diene monomer). Roll No. 4 was a phenyl silicone. Roll No. 5 was a rough ground silicone elastomer coating on a polyurethane foam roll made of Endur C-300, available from Rogers Corporation.

| Roll No. | Average Coefficient of Friction Excluding Initial Reading | Low/Highest Coefficient Friction |
| --- | --- | --- |
| 1 | 1.59 | 1.46/1.70 |
| 2 | 1.51 | 1.10/1.90 |
| 3 | 1.43 | 1.35/1.50 |
| 4 | 1.39 | 1.27/1.50 |
| 5 | 1.16 | 0.88/1.38 |

As may be observed from this data the isoprene is particularly erratic in performance, exhibiting a rather high coefficient of friction with fresh paper and a rather low coefficient with once fused sheets. The EPDM roll maintained a fairly uniform coefficient of friction for both new sheets and fused sheets but it fell to an unacceptably low level of 1.35.

Thus according to the present invention a novel sheet transport member has been provided which may take the form of a cylindrical roll or a transport belt which may be used in the feeding of sheets in automatic printing machines where the sheets may have passed once through the fuser assembly and have had silicone oil release agent applied to the fuser roll and transferred to the sheet or in the alternative new virgin sheets which have not passed through the processor. The transport member has the advantage in that it is not negatively affected by either the silicone oil release agent from the fuser or by the debris and other contaminates on the virgin paper. Furthermore, the stable coefficient of friction maintained in an environment which may be contaminated with oil, paper debris, paper contaminates, toner, etc. leads to a long life economical sheet transport system. In addition in the transport of fresh sheets it has been determined that the fresh sheets both clean the transport roll and contaminate it at the same time in that they tend to clean off any silicone oil and other contaminates present on the transport roll while at the same time delivering some of the contaminates from the fresh sheet. Furthermore, the transport members according to the present invention have the significant additional advantage of providing greater toughness, better physical properties such as compression set which tend to extend wear and life. In addition, the present invention offers the further advantage in that it is capable of being practiced with equipment and techniques that are typically used in high volume thermoplastic type processing as opposed to the somewhat smaller volume techniques typically used in the processing of elastomers thereby providing more economical parts.

The patents referred to herein are hereby totally specifically totally incorporated herein by reference.

While the present invention has been described with reference to specific embodiments it will be apparent that many alternatives modifications and variations may be made by those skilled in the art. For example, while the invention has been illustrated with regard to a transport member in the form of a roll or belt it will be understood that it may take other configurations such as a multifaceted five, six, or more-sided member. Accordingly it is intended to embrace all such alternatives and modifications as may fall within the spirit and scope of the appended claims.

We claim:

1. A sheet transport member having at least one surface for movable engagement with a sheet to be transported, said surface comprising an elastomeric thermoplastic styrene-butylene-styrene block copolymer and a polysiloxane substantially uniformly dispersed throughout said copolymer, said polysiloxane being present in an amount of from about 0.5% to 8% by weight of the total weight of the composition and having a viscosity of from about 20 to 1,000,000 centistokes.

2. A cylindrical sheet transport roll having an exterior surface for movable engagement with a sheet to be transported, said surface comprising an elastomeric thermoplastic styrene-ethylene-butylene-styrene block copolymer and a polysiloxane substantially uniformly dispersed throughout said copolymer, said polysiloxane being present in an amount of from about 0.5% to 8% by weight of the total weight of the composition and having a viscosity of from about 20 to 1,000,000 centistokes.

3. The member of claim 1 further including mineral oil dispersed substantially uniformly throughout said block copolymer, said mineral oil comprising from about 30% to about 50% by weight of the total weight of the composition.

4. The member of claim 3 wherein said mineral oil is present in an amount of about 40% by weight of the total weight of the composition.

5. The member of claim 1 wherein said polysiloxane is present in an amount of from about 4% to about 6% by weight of the total weight of the composition.

6. The member of claim 3 wherein said polysiloxane and mineral oil form a gelated pseudo interpenetrating network within the block copolymer.

7. The member of claim 1 wherein said polysiloxane has the formula:

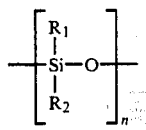

where $R_1$ and $R_2$ may be hydrogen, methyl or phenyl and $10 < n < 20,000$.

8. An endless sheet transport belt having an exterior surface for movable engagement with a sheet to be transported, said surface comprising an elastomeric thermoplastic styrene-ethylene-butylene-styrene block copolymer and a polysiloxane substantially uniformly dispersed throughout said copolymer, said polysiloxane being present in an amount of from about 0.5% to 8% by weight of the total weight of the composition and having a viscosity of from about 20 to 1,000,000 centistokes.

9. The member of claim 2 further including mineral oil dispersed substantially uniformly throughout said block copolymer, said mineral oil comprising from about 30% to about 50% by weight of the total weight of the composition.

10. The member of claim 9 wherein said mineral oil is present in an amount of about 40% by weight of the total weight of the composition.

11. The member of claim 9 wherein said polysiloxane is present in an amount of from about 4% to about 6% by weight of the total weight of the composition.

12. The member of claim 9 wherein said polysiloxane and mineral oil form a gelated pseudo interpenetrating network within the block copolymer.

13. The member of claim 2 wherein said polysiloxane has the formula:

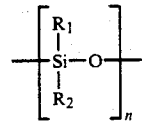

where $R_1$ and $R_2$ may be hydrogen, methyl or phenyl and $10 < n < 20,000$.

14. The member of claim 8 wherein said polysiloxane has the formula:

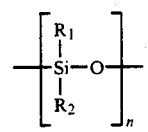

where $R_1$ and $R_2$ may be hydrogen, methyl or phenyl and $10 < n < 20,000$.

* * * * *